No. 823,025. PATENTED JUNE 12, 1906.
L. BOISARD.
CUTTING BEVELED TEETH.
APPLICATION FILED AUG. 25, 1904.

3 SHEETS—SHEET 1.

Witnesses
Guillaume Dioche
Hippolyte Villelongue

Inventor
Louis Boisard

No. 823,025. PATENTED JUNE 12, 1906.
L. BOISARD.
CUTTING BEVELED TEETH.
APPLICATION FILED AUG. 25, 1904.
3 SHEETS—SHEET 2.
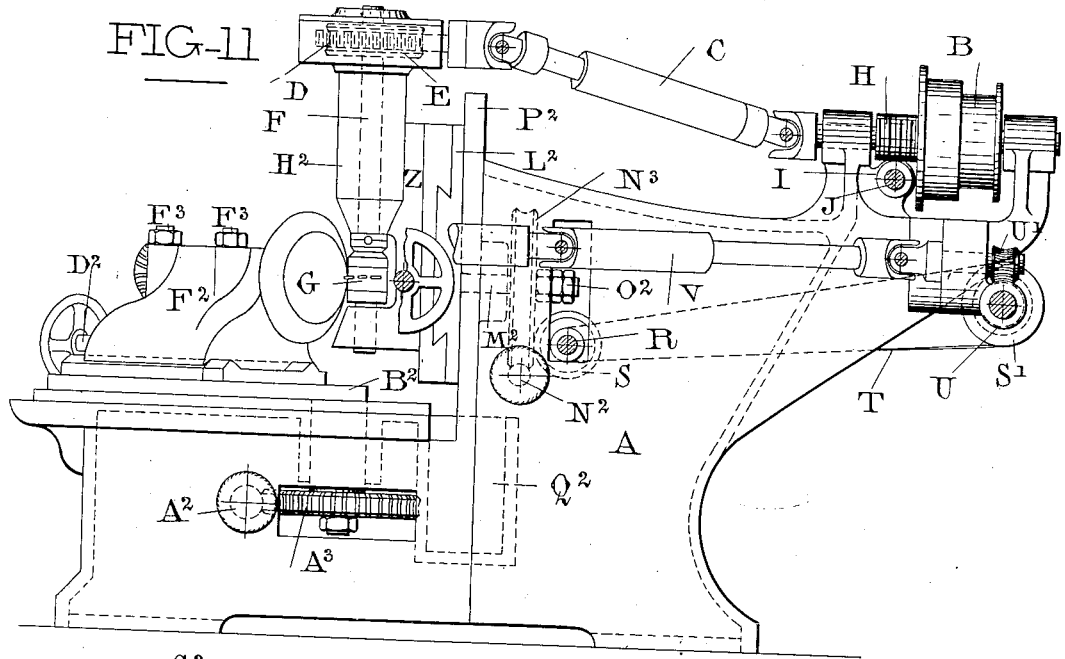
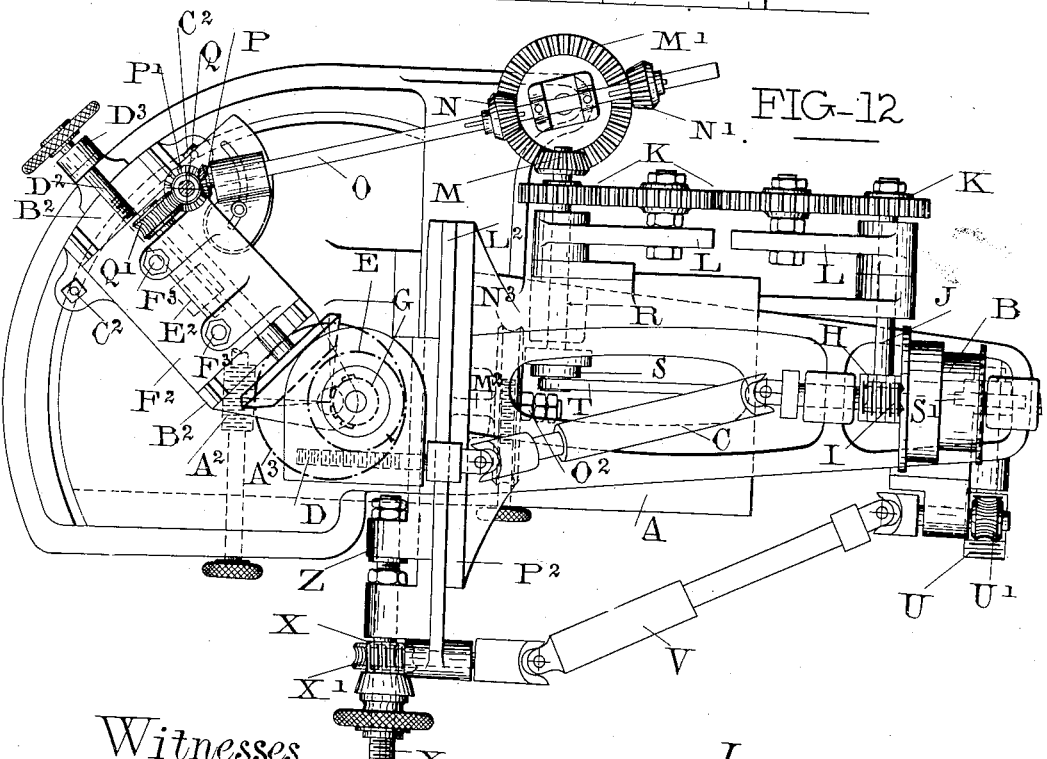
Witnesses
Guillaume Pioche
Hippolyte Villelongue
Inventor
Louis Boisard

UNITED STATES PATENT OFFICE.

LOUIS BOISARD, OF LYON, FRANCE.

CUTTING BEVELED TEETH.

No. 823,025.        Specification of Letters Patent.        Patented June 12, 1906.

Application filed August 25, 1904. Serial No. 222,156.

*To all whom it may concern:*

Be it known that I, LOUIS BOISARD, a citizen of the French Republic, residing at Lyon, France, have invented certain new and useful Improvements in Cutting Beveled Teeth, of which the following is a specification.

This invention relates to the automatic cutting of bevel-gears by means of helicoidal milling-cutters.

Figure 1:
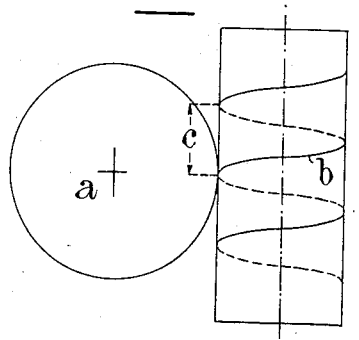
Figure 2:
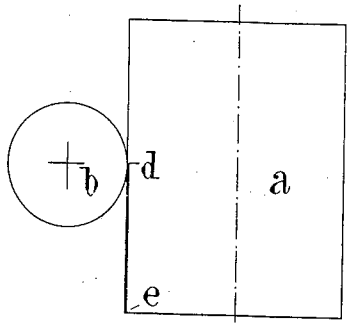
Figure 3:
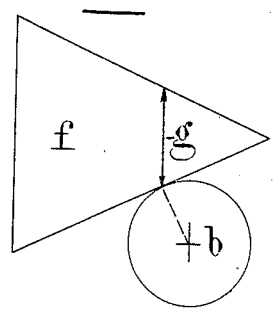
Figure 4:
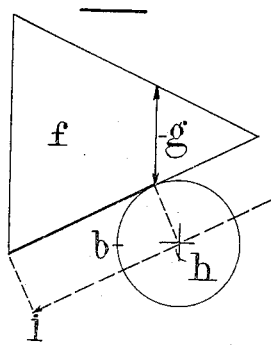
Figure 5:
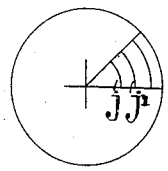
Figure 6:
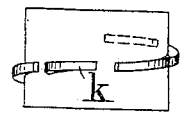
Figure 8:
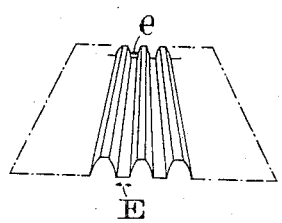
Figure 7:
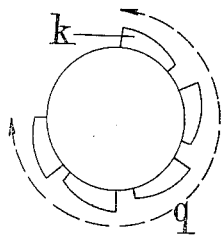
Figure 9:
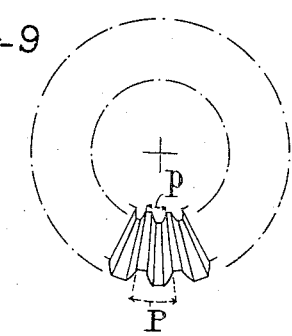
Figure 10:
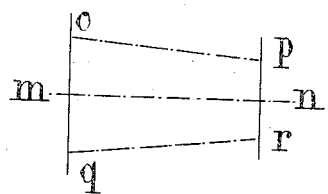
Figure 13:
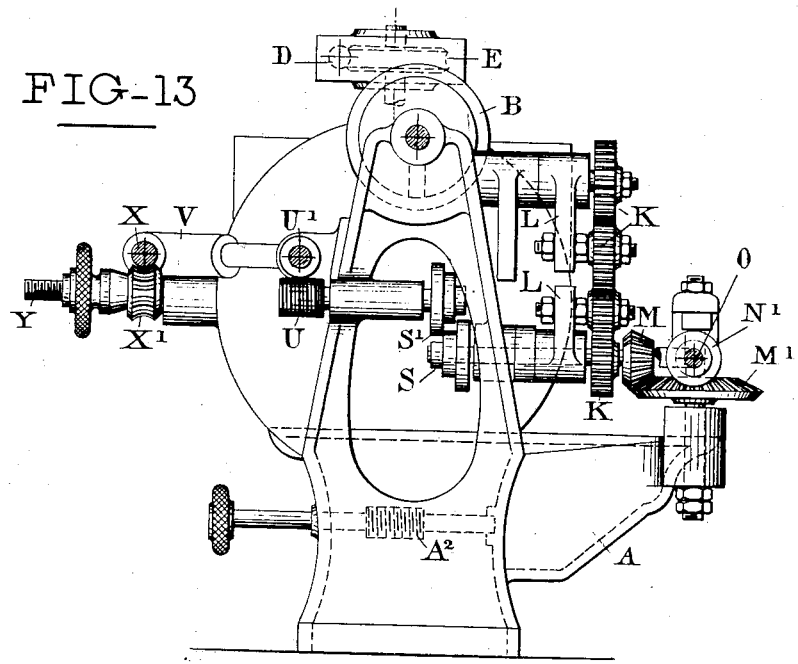

In the annexed drawings, Figures 1 and 2 are diagrams illustrating the cutting of the teeth of spur-wheels by means of a helicoidal milling-cutter. Figs. 3, 4, and 5 are diagrams illustrating the application of the same principle to the cutting of the teeth of beveled wheels. Figs. 6 and 7 are elevation and plan, respectively, of the helicoidal milling-cutter for cutting beveled teeth according to this invention. Figs. 8 and 9 are further diagrams of beveled wheels. Fig. 10 is a diagram illustrative of certain rocking movements to be given to the milling-cutter to obtain proper rolling contact-profiles to the beveled teeth cut thereby. Fig. 11 is a side elevation, Fig. 12 a plan, and Figs. 13 and 14 end elevations, of a machine for cutting the gears based upon the principles hereinafter more particularly described.

In cutting gear-wheels by means of a helicoidal milling-cutter placed so that the axis of the helix of the cutter is tangential to a circle concentric with the wheel that is being cut the cutter and the wheel are revolved at such relative speeds $v$ and $V$, respectively, that the cutter makes $n$ revolutions for each revolution of the wheel having $n$ teeth, the pitch of the helix being equal to the pitch of the teeth. This may be represented by the formula $\frac{V}{n}$. This action is illustrated in Fig. 1, in which $a$ is the wheel, and $b$ the cutter. (Shown in diagram only.) The series of cutting-teeth following one another at intervals along the line of the helix is continued through three or more complete coils $c$ of the helix, in order to give to the teeth the proper profile for correct rolling action. It is essential also to give the cutter a movement of translation in a direction $e\,d$ parallel to the axis of the wheel, as shown in Fig. 2, in order that it may act in due course equally along the faces of the teeth over the whole thickness of the wheel. In applying the same principle, however, to the cutting of beveled wheels the difficulty arises that as the pitch varies in proportion to the distance from the apex of the cone $f$, Fig. 3, a cutter suitable, for example, to work at any one diameter $g$, Fig. 3, is unsuitable at other diameters, for if the cutter has the pitch $c$, Fig. 1, suitable, with three coils, to work simultaneously on the faces of three teeth at diameter $g$ any movement of this cutter toward the base of the cone $f$ would cause it to cut too deeply onto the two outer teeth and so destroy them, and, similarly, movement toward the apex of the cone would cause it to miss the two outer teeth and even attack the two teeth lying beyond them and so destroy the latter.

The present invention comprises a helicoidal milling-cutter in which the series of cutters do not extend through more than one convolution of the helix or less and with which other means are provided for obtaining such movement as is necessary to give the correct rolling profile to the teeth which would have been given by the convolutions that have been omitted.

Figs. 6 and 7 represent a helical cutter $k$ with a single thread forming only a part of a whole convolution, the pitch of which corresponds, for instance, with the smallest pitch of a given bevel-wheel having $n$ teeth. The cutter must make $n$ revolutions during one complete revolution of the cone. The cutter, penetrating to the proper extent into the cone, will exactly divide the circumference into $n$ parts, producing in the cone $n$ grooves corresponding to the thickness of the thread. If the cutter is caused to travel toward the base of the cone through a path parallel with the generator of the latter, the groove cut by it will become larger, the enlargement being a function of the pitch of the helix, the distance traveled on the generator of the cone, and the number $n$ of teeth. Given these factors, it will therefore only be necessary to leave on the cutter the number of teeth $q$ corresponding to that portion of the helix which calculation based on the said factors will indicate.

Taking a bevel-pinion with $n$ teeth, let $p$, Figs. 8 and 9, be the pitch at the base or root of the teeth at the smallest part of the cone, $P$ the pitch at the largest part of the cone, and $l$ the length of one tooth. The base of the tooth must have the breadth $e$ at the smallest part of the cone and the breadth $E$ at the largest part of the cone. The pitch of the helix equals $p$. With regard to the action of the helix at the circumference of the large base during the fraction $\frac{l}{n}$ of a revolution of the cone the base of the tooth on the cone travels through P, while the pitch of the helix travels through $p$. The base of the tooth will therefore be enlarged by the difference $P-p$, since part of the cone slides past the cutter. This must, however, only take place to the extent of $E-e$. If, therefore, C is a complete convolution of the helix, only a portion thereof equal to $C \times \frac{E-e}{P-p}$ must be operative. With this helical cutter, the development of the thread of which is equal to the value indicated, an exact division of the cone into $n$, perfectly uniform pyramidal teeth can be effected; but a section of any one of these teeth in a plane perpendicular to the base of the pyramid is not limited by the curves desirable as rolling surfaces. The usual way of effecting this is to work with as many convolutions on the helix as there are teeth in engagement in the gear. This is impracticable with beveled gears, as mentioned above. Since the generators of the cone are at angles, it would be necessary to use an extensible cutter, which would be difficult to obtain. It is more simple to proceed in the following manner: Let $m-n$, Fig. 10, be the axis of the cone. The trajectory of the helix will be projected on the same line, $o-p$ will be the inclination of the projection of the next tooth above the first tooth, and $q-r$ the projection of the next tooth below the first tooth. When the first tooth is made in the direction of the axis $m-n$, the cutter is moved from $m$ to $o$ to the extent of exactly one-pitch space, and a second cut is made along the trajectory $o-p$. Then a third cut is made along $q-r$. In practice the manner in which successive cuts are made at the desired intervals of space is very simple. It is sufficient after making the cut parallel to $m-n$ to place the cutter at the summit of the cone and to give to the slide which guides the cutter the angle of inclination of the first tooth above that of the center and then the angle of inclination of the first tooth below that of the center. By this means the average direction of the cutting part of the helix during the first cut is caused to coincide with the axis $m-n$. During the second cut this direction follows the axis $o-p$, and during the third cut it follows the axis $q-r$. In practice these three cuts will be sufficient; but further passes may also be made corresponding, respectively, to the second tooth above or below the center if rolling contact extends over five teeth. By this means any desired degree of precision with regard to the limiting revolution curves of the teeth can be obtained. It may be mentioned that in practice sufficient accuracy will be obtained if the cut along the line $m-n$ is dispensed with, only the other two cuts being used.

The machine for carrying out the method described must comprise means for adjusting the cutter and the cone and for imparting the various movements required, namely: first, the rotation of the cutter; second, the rotation of the cone to be cut; third, the displacement of the cutter along a generator of the cone at the roots of the teeth cut.

Six adjustments must be provided for, namely: (a) The adjustment of the cone with regard to the direction of its axis, so that the generator at the roots of the teeth is parallel to the path of the cutter; (b) the adjustment of the cone in such a manner that when its axis has been placed in the proper direction its summit is placed in the trajectory of the cutter; (c) the adjustment of the cutter with regard to the angle of inclination of its axis, so that the average direction of movement of the cutting part of the helix is at the proper angle with regard to the plane containing the axis of the cone and the cone-generator in question; (d) the adjustment of the slide supporting the cutter in such a manner that the trajectory of the cutter lies in the desired directions during the different cuts; (e) the relative adjustment of the number of revolutions made by the cutter and the cone, respectively; (f) the adjustment of the velocity with which the cutter is displaced. The machine illustrated in the annexed drawings fulfils all these requirements; but the same result can be obtained by other mechanical means without departing from the principle of the invention.

The machine comprises a frame A, which supports all the parts. The step-pulley B, which is driven by any suitable means, transmits movement by means of the cardan-joint C to the worm D. The latter drives the helical cutter G by means of the worm-wheel E and the shaft F. The worm H, integral with the pulley B, drives the worm-wheel I and the shaft J, the movement of the latter being transmitted, by means of the gear-wheels K K, mounted in the arms L L, to the bevel-pinions M and M'. With the pinion M' the pinions N and N' can be separately thrown into gear. The pinions N and N' are keyed to the shaft O, to the end of which is fixed the bevel-pinion P, meshing with the wheel P'. The axle of the latter is provided with the worm Q, which drives the worm-wheel Q', and the cone to be cut is fixed to the axle of the said worm-wheel Q'. To the axle R of the pinion M is fixed the step-pulley S, which drives, by means of the belt T, the step pulley S'. The latter is integral with the worm U, which drives the worm-wheel U'. The movement of the worm-wheel U' is transmitted by means of the cardan-joint V to the worm X, which drives the worm-wheel X'. The latter is internally screw-threaded and mounted on the screw Y, which is fixed to the cutter-slide Z and adapted to impart to the latter longitudinal movement along the generator of the cone. The three principal movements being obtained in the manner described the regulation and adjustments are effected as follows:

(a) The adjustment of the axis of the cone in such a manner that the generator of the cone is parallel to the path of the cutter is effected by means of the worm $A^2$ and worm-wheel $A^3$. When the part $B^2$, which is integral with the worm-wheel $A^3$, has been adjusted in the desired position, it is fixed to the frame A by means of the screws $C^2 C^2$.

(b) The longitudinal adjustment of the cone in such a manner that after its axis has been placed in the desired direction its summit is in the trajectory of the cutter is effected by means of the worm $D^2$, which is operated by means of a hand-wheel, the axle of which is rotatable, but not longitudinally movable in the bearing $D^3$, fixed to the part $B^2$. The worm $D^2$ engages the nut $E^2$, which is fixed to the slide $F^2$. When the latter has been adjusted in the desired position, it is fixed to the part $B^2$ by means of the screws $F^3$.

Figure 14:
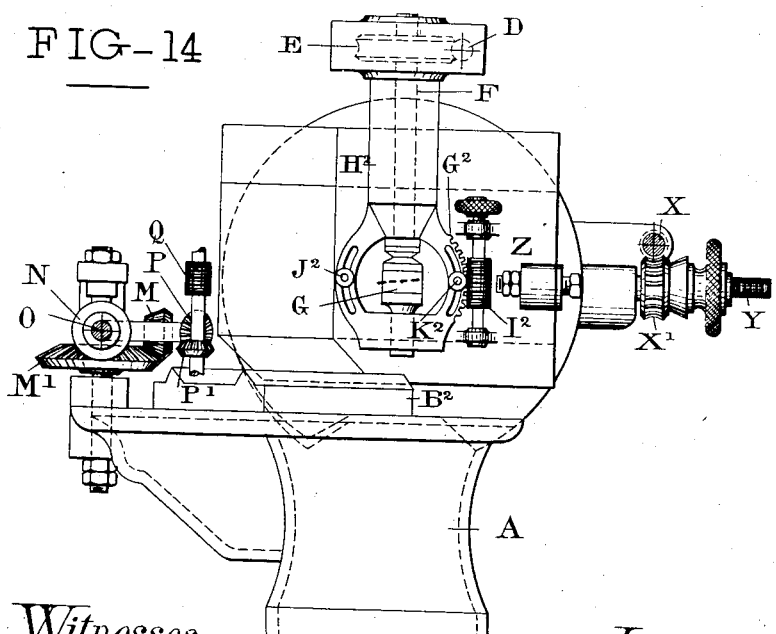

(c) The adjustment of the cutter with regard to the direction of its axis in such a manner that the average direction of the cuting part of the helix is at the desired angle with regard to the plane containing the cone-axis and the generator in question is effected by means of the toothed segment $G^2$, Fig. 14, fixed to the cutter, this segment being operated by means of the worm $I^2$, mounted on the slide Z, supporting the cutter. When the shaft F has been adjusted, as desired, the cutter-holder is fixed to the slide Z by means of the screws $J^2$ and $K^2$.

(d) The adjustment of the slide supporting the cutter in such a manner that the trajectory of the cutter follows the angle indicated by the diagram is obtained by rotating the slide $L^2$ about the axle $M^2$ by means of the worm $N^2$ and worm-wheel $N^3$, the latter being fixed to the said slide $L^2$. When the desired angle has been obtained, the slide $L^2$ is fixed, by means of the nuts $O^2$, to the plate $P^2$, which forms part of the frame A.

(e) The desired ratios between the number of revolutions made by the cutter and the cone, respectively, is obtained by means of the train of change-gear K K, the slotted bearing-arms L L of which are rotatable about the axles J and R.

(f) The velocity with which the cutter is longitudinally displaced is as a rule regulated by changing the gear-train K K; but a coarse adjustment is effected by means of the belt T and the step-pulleys S and S'.

All the adjusting-wheels referred to are provided with verniers to indicate even the smallest movements. The oil by means of which the cutter is liberally lubricated descends onto the horizontal part of the frame A and flows through a channel surrounding the table of the frame to the receptacle $Q^2$, from which it is returned to the cutter by means of a pump.

Although the machine described is specially designed for the cutting of bevel-gears, it can also be used for other purposes, more particularly for cutting conical cutters.

I claim, in means for cutting beveled teeth—

1. The combination of a helical cutter having a pitch equal to that of the teeth to be cut at the small diameter of the cone and having a development equal to a fraction of a convolution of the helix, means for displacing the cutter parallelly to the generator of the cone, and means for giving relative simultaneous rotation to cutter and cone according to the equation $V = \dfrac{v}{n}$.

2. The combination of a helical cutter having a pitch equal to that of the teeth to be cut at the small diameter of the cone and having a development equal to a fraction of a convolution of the helix, means for giving relative simultaneous rotary movements to the cutter and cone according to the equation $V = \dfrac{v}{n}$, means for displacing the cutter parallelly to the generator of the cone, and means for displacing the cutter in such relation to the teeth as to bring the latter to the desired profile for rolling contact by a plurality of passes.

3. The combination of a cone-blank holder of a helical cutter having a pitch equal to that of the teeth to be cut at the small diameter of the cone and having a development equal to a fraction $C\dfrac{E-e}{P-p}$ of a convolution of the helix, the axis of said cutter lying in a plane perpendicular to that of the cone, means of relative displacement of said cone-holder and cutter whereby the cutter follows a generator of the cone and means for giving relative simultaneous rotation to the cutter and cone-holder according to the equation $V = \dfrac{v}{n}$.

In witness whereof I have signed this specification in the presence of two witnesses.

LOUIS BOISARD.

Witnesses:
  GUILLAUME PIOCHE,
  HIPPOLYTE VILLELONGUE